(12) United States Patent
Vah et al.

(10) Patent No.: US 11,294,755 B2
(45) Date of Patent: Apr. 5, 2022

(54) AUTOMATED METHOD OF IDENTIFYING TROUBLESHOOTING AND SYSTEM REPAIR INSTRUCTIONS USING COMPLEMENTARY MACHINE LEARNING MODELS

(71) Applicant: Dell Products L.P., Round Rock, TX (US)

(72) Inventors: Jeffrey S. Vah, Austin, TX (US); Jimmy H. Wiggers, Cedar Park, TX (US); Ravi Shukla, Bangalore (IN); Brian T. Martin, Austin, TX (US); Nikhila Kambalapalli, Pflugerville, TX (US); M. Najam Mushtaq, Houston, TX (US); Carlos F. Rodman, Round Rock, TX (US); Brock A. Adams, Katy, TX (US)

(73) Assignee: Dell Products L.P., Round Rock, TX (US)

(*) Notice: Subject to any disclaimer, the term of this patent is extended or adjusted under 35 U.S.C. 154(b) by 152 days.

(21) Appl. No.: 16/503,819

(22) Filed: Jul. 5, 2019

(65) Prior Publication Data
US 2021/0004284 A1  Jan. 7, 2021

(51) Int. Cl.
*G06F 11/00* (2006.01)
*G06F 11/07* (2006.01)
*G06N 20/00* (2019.01)

(52) U.S. Cl.
CPC ........ *G06F 11/079* (2013.01); *G06F 11/0751* (2013.01); *G06F 11/0787* (2013.01); *G06N 20/00* (2019.01)

(58) Field of Classification Search
CPC ............. G06F 11/079; G06F 11/0751; G06F 11/0766; G06F 11/0787
See application file for complete search history.

(56) References Cited

U.S. PATENT DOCUMENTS

| | | | | |
|---|---|---|---|---|
| 7,209,860 B2 * | 4/2007 | Trsar | ............... | G06F 11/2257 701/31.4 |
| 7,305,465 B2 * | 12/2007 | Wing | .................. | G06Q 10/06 709/223 |
| 7,890,447 B2 * | 2/2011 | Abels | .................. | G06N 5/025 706/47 |
| 8,019,456 B2 * | 9/2011 | Soga | ................... | G06Q 10/06 700/110 |
| 10,263,836 B2 * | 4/2019 | Jain | .................... | H04L 41/0672 |
| 10,332,319 B2 * | 6/2019 | Merg | ................. | G07C 5/0808 |
| 10,380,520 B2 * | 8/2019 | Srivastava | ............ | H04L 41/16 |
| 10,652,079 B2 * | 5/2020 | Ponnuswamy | ..... | H04L 41/0654 |

(Continued)

*Primary Examiner* — Elmira Mehrmanesh
(74) *Attorney, Agent, or Firm* — Terrile, Cannatti & Chambers, LLP; Emmanuel A. Rivera

(57) ABSTRACT

A system, method, and computer-readable medium for performing a system failure repair operation, comprising: receiving information regarding symptoms related to a faulty device; storing the information with other historical information regarding the symptoms; receiving additional information as the faulty device is diagnosed; indicating whether a repair recommendation is provided for the faulty device; and using the stored information, historical information, and additional information to provide a repair recommendation if indicating shows no repair recommendation.

20 Claims, 15 Drawing Sheets

(56) References Cited

U.S. PATENT DOCUMENTS

| | | | |
|---|---|---|---|
| 10,769,043 B2* | 9/2020 | Sabharwal | G06F 11/2263 |
| 10,771,314 B2* | 9/2020 | Misra | G06F 11/3684 |
| 2006/0106796 A1* | 5/2006 | Venkataraman | G05B 23/0216 |
| 2006/0129265 A1* | 6/2006 | Ouchi | G06Q 10/06 |
| | | | 700/110 |
| 2014/0310222 A1* | 10/2014 | Davlos | G06F 11/2294 |
| | | | 706/46 |
| 2015/0348051 A1* | 12/2015 | Bodda | G06Q 30/016 |
| | | | 705/304 |

\* cited by examiner

AUTOMATED METHOD OF IDENTIFYING TROUBLESHOOTING AND SYSTEM REPAIR INSTRUCTIONS USING COMPLEMENTARY MACHINE LEARNING MODELS

BACKGROUND OF THE INVENTION

Field of the Invention

The present invention relates to information handling systems. More specifically, embodiments of the invention relate to identifying, troubleshooting and system repair instructions using complementary machine learning models.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium for performing a system failure repair operation, comprising: receiving information regarding symptoms related to a faulty device; storing the information with other historical information regarding the symptoms; receiving additional information as the faulty device is diagnosed; indicating whether a repair recommendation is provided for the faulty device; and using the stored information, historical information, and additional information to provide a repair recommendation if indicating shows no repair recommendation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
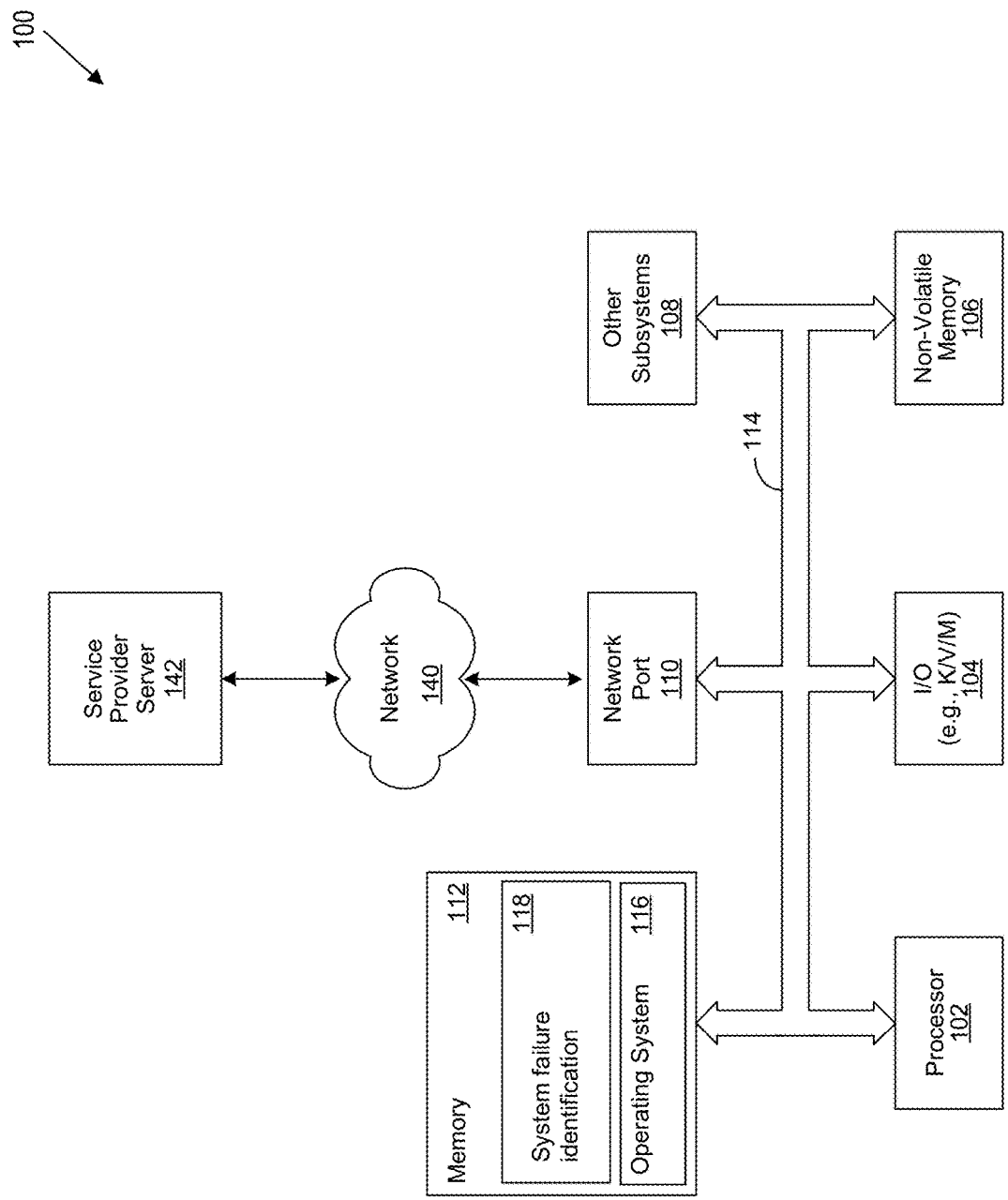
FIG. 1 shows a general illustration of components of an information handling system as implemented in the system and method of the present invention.

A system, method, and computer-readable medium are disclosed for identifying, troubleshooting and system repair instructions using complementary machine learning models.

In certain embodiments, the system failure identification operation analyzes onboard telemetric data, global repair insights, and customer facing symptoms and complaints to recommend the most probable repair solution. In certain embodiments, the system failure identification operation provides an end-to-end method for accurately identifying system failures. In certain embodiments, the system failure identification operation applies a machine learning model to cloud-based data to recommend the most probable repair solution.

When a faulty device (i.e., a system or component) arrives at a repair depot, repair technicians perform diagnostic tests, identify possible causal factors, record the possible causal factors and assess the system or component for an appropriate determination of symptoms so that appropriate commodities (i.e., parts) may be provided to the customer for a possible repair. In certain embodiments, the possible causal factors are identified as suspected failures. Often the identification of possible causal factors is based on repair technicians accessing prior troubleshooting steps. In certain embodiments, these prior troubleshooting steps are often accessed via a function key (e.g., F9) which provides a list of comments and customer complaints. In various embodiments, the determination of symptoms can include identification of spillage, power issues, battery issues, etc.

In certain embodiments, the system failure identification operation includes a depot triage process. More specifically, when performing a depot triage process, repair technicians record possible causal factors contributing to the device failure. In certain embodiments, the possible causal factors contributing to the device failure are accessed via a function command. Next, repair depot personnel determine suspected failures using the possible causal factors and a visual assessment of the device. Next, the repair technicians correlate the symptoms with appropriate commodities to be provided to the customer for a possible repair.

Such a system failure identification operation avoids manual dependence and leverages data science capability to drive intelligence in parsing (e.g., the F9 comments), classification (e.g., of symptoms) and correlation (e.g., with part commodities). In certain embodiments, the system failure identification operation characterizes new failures and then matches the characterized failures against previous cases to pinpoint the cause of failure and continually learn. In certain embodiments, the system failure identification operation accesses various databases, that can include a repair database with historical repair data. In certain embodiments, the system failure identification operation performs a multi-stage data check with validation of successful system repair but also part replacement validation.

In certain embodiments, the system failure identification operation uses a dedicated machine learning engine. The machine learning engine can utilize structured and unstructured data or information from various complementary sources in developing machine learning models to provide diagnostic, recommendation, and validation in troubleshooting and repair a faulty device.

In certain implementations, the machine learning engine provides information to a system failure identification user interface to allow the system failure identification user interface to provide information regarding symptom classification, correlation of symptoms with commodities and commodity recommendations to assist in directing repair operations.

In certain implementations, recommendations or predictions regarding repair may be incorrect or may not be provided. In certain instances, there may be insufficient information or too much information as to device symptoms to make a recommendation or a prediction. This can take place when multiple parts of a faulty device are affected and can be attributed to the quality of data that the machine learning engine receives. The quality of the data can be through the data captured through customer call logs entered in a free form manner by repair technicians or other data that is received by the machine-learning engine. For example, the machine-learning engine may use natural language in process of customer call logs and may be unable to distinguish between true signal versus noise.

In certain embodiments, in order to improve higher accuracy in recommendations and predictions, machine learning models are implemented, which uses complementary data or information, such as expert and non-expert troubleshooting data to distinguish between true signal and noise. In certain implementations, an expert troubleshooting system standardizes and dynamically guides repair technicians through a process of isolating to a single defective part with a higher degree of confidence. In certain implementations, repair technicians can use an interactive and dynamic graphical user interface (GUI) that provides standardized dropdowns for symptoms, symptoms, conditions, repair actions, diagnostic results, etc. The machine learning modes can be implemented to dynamically/automatically populate the standardized dropdowns as to relevant options to repair technicians, which can be based on historical repair data and other data or information. The automatically populated dropdowns can avoid scenarios where only a few values of dropdowns are selected.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a system failure identification system 118.

The system failure identification system 118 performs a system failure identification operation. As will be appreciated, once the information handling system 100 is configured to perform the system failure identification operation, the information handling system 100 becomes a specialized computing device specifically configured to perform the system failure identification operation and is not a general-purpose computing device. Moreover, the implementation of the system failure identification operation on the information handling system 100 improves the functionality of the information handling system and provides a useful and concrete result of automatically identifying system failure information for use in attempting to repair computing devices or other information handling systems.

Figure 2:
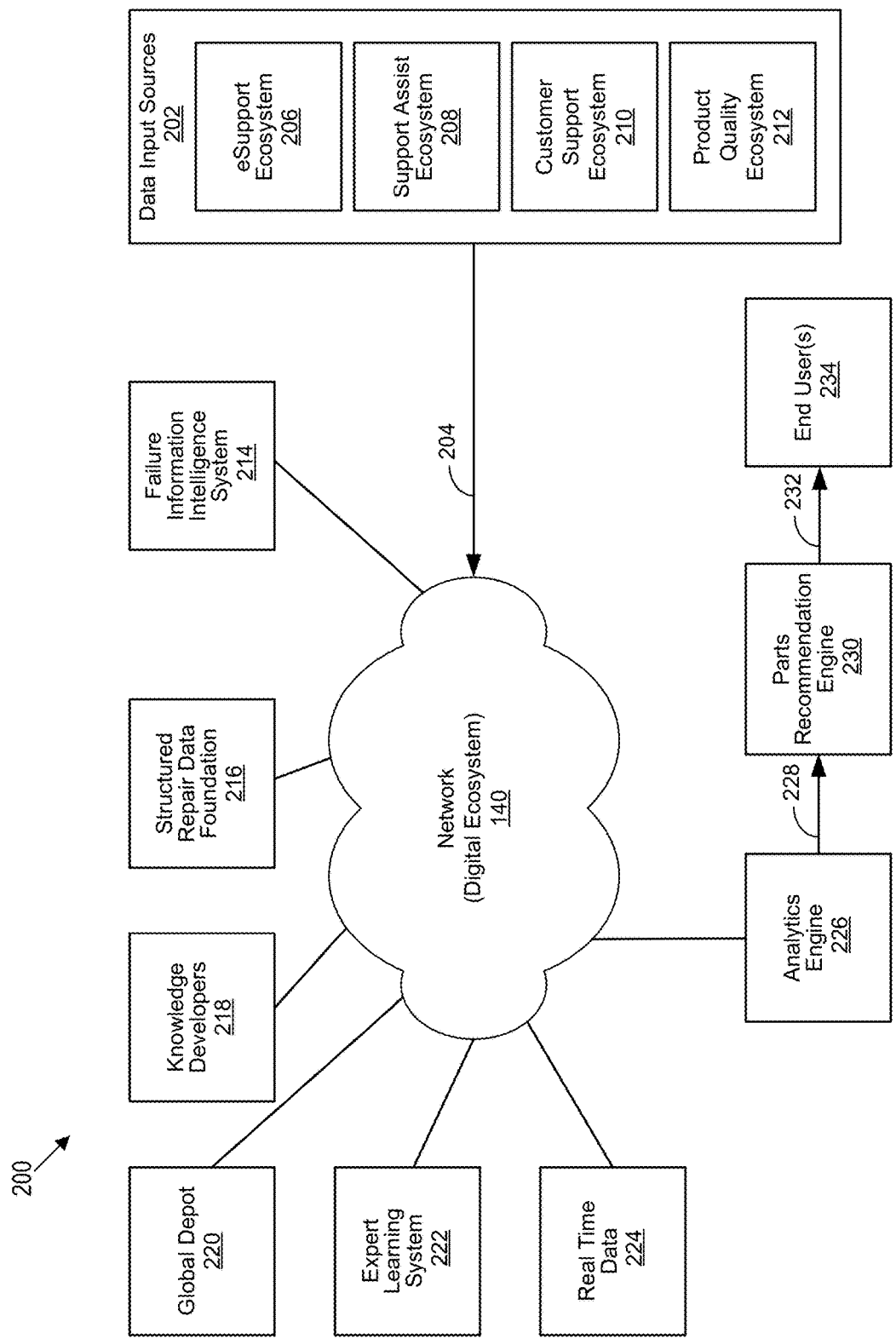
FIG. 2 shows a block diagram of an expert troubleshooting system environment as implemented in the system and method of the present invention.

FIG. 2 is a block diagram of an expert troubleshooting system environment 200 in accordance with an embodiment of the invention. The expert trouble shooting system environment 200 includes network 140. The network 140 can include multiple and various networks, including secure and unsecure networks, such as the Internet. Network 140 can further include wired and wireless networks that include various computing resources, such as servers and cloud computing resources. Network 140 can be further be defined as a digital ecosystem and specifically as a digital expert troubleshooting system (DETS).

In certain embodiments, as a DETS, the network 140 integrates or connects various entities, in identifying, troubleshooting, and providing repair recommendations and predictions. In specific, the various entities can provide input, data or information in developing and updating the machine learning model.

In certain implementations, data input sources 202 provide different types of data 204 to the network 140. For example, data input sources 202 can include an eSupport ecosystem 206 that provides customer information; a support assist ecosystem 208 that provides product failure telemetry data; a customer support ecosystem 210 that provides customer failure information/data; and product quality support ecosystem 212 that provides known product quality issues.

In certain implementations, a failure information intelligence system 214 receives the data 204. The failure information intelligence system 214 can be part of the network 140 and receive data 204. Failure information intelligence system 214 can use the data 204 for guided troubleshooting and repair resolution and support. In specific, failure information intelligence system 214 can determine what parts of a faulty device actually failed.

In certain embodiments, the expert troubleshooting system environment 200 through the DETS or network 140 includes a structured repair data foundation 216 that can implement industry standard data and language that can allow to better focus on problems. For example, the use of standard data and language can allow to use key words to map to a structure. The DETS or network 140 can include knowledge engineers or developers 218, who provide their information into the machine learning model. The information can include what symptoms to look for, data structure, drop down menus for dynamic interactive GUI, particular interfaces, accommodations for different problems/instances, etc. A global depot 220 represents repair technicians that provide input and information as to repairs that are performed. As further discussed below, in certain implementations, repair technicians can provide input and information through a dynamic GUI. An expert learning system 222 builds a dynamic trouble shooting knowledge base. Real time input or data 224 can be real time data from various sources.

In certain implementations, the DETS or network 140 includes an analytics engine 226 that processes data and information such that signal is separated from noise. In other words, filtering can be performed to distinguish actual relevant information (i.e., signal) from not so relevant or irrelevant information (i.e., noise). In certain implementations, the analytics engine 226 can provide an output 228 to a parts recommendation engine 230. The recommendation engine 230 can provide recommendations as to replacement or repair parts 232 to end user(s) 234. End user(s) 234 can include chatbots, computer information systems (CIS), customer support, onsite depots, etc.

Figure 3:
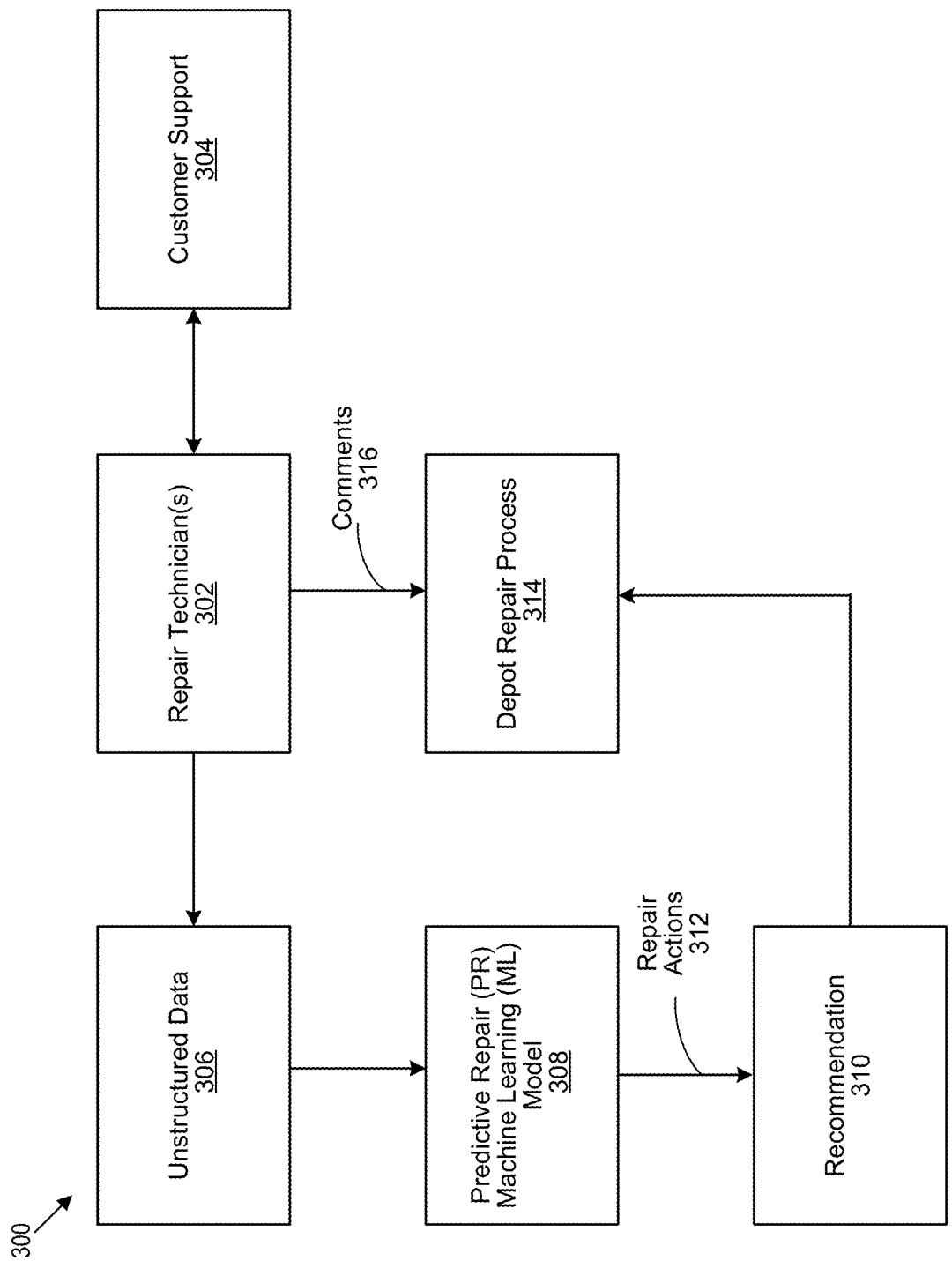
FIG. 3 shows a block diagram of a repair recommendation environment as implemented in the system and method of the present invention.

FIG. 3 is a block diagram of a repair recommendation environment 300 implemented in accordance with an embodiment of the invention. In various embodiments, elements of the repair recommendation environment 300 make use of the expert troubleshooting system environment 200 described in FIG. 2.

Technical personnel, such as deport repair personnel as represented by repair technician(s) 302 interact with customer support 304. In certain implementations, the customer support 304 is provided as end user(s) 234 described above. Repair technician(s) 302 provide/create unstructured data 306, which can include call logs. The unstructured data 306 is provided to a predictive repair (PR) machine learning (ML) model 308. The PR ML model 308 capability is enhanced with expert repair information, such as issues, symptoms, diagnostics, and repair actions provided by the expert troubleshooting system environment 200. The PR ML model 308 provides a recommendation 310, which can include repair parts and components and repair actions 312. The recommendation 310 can go to a depot repair process 314. The depot repair process 314 can receive comments 316 from repair technician(s) 302. The depot repair process 314 may also be enhanced with input from expert troubleshooting system environment 200.

Figure 4:
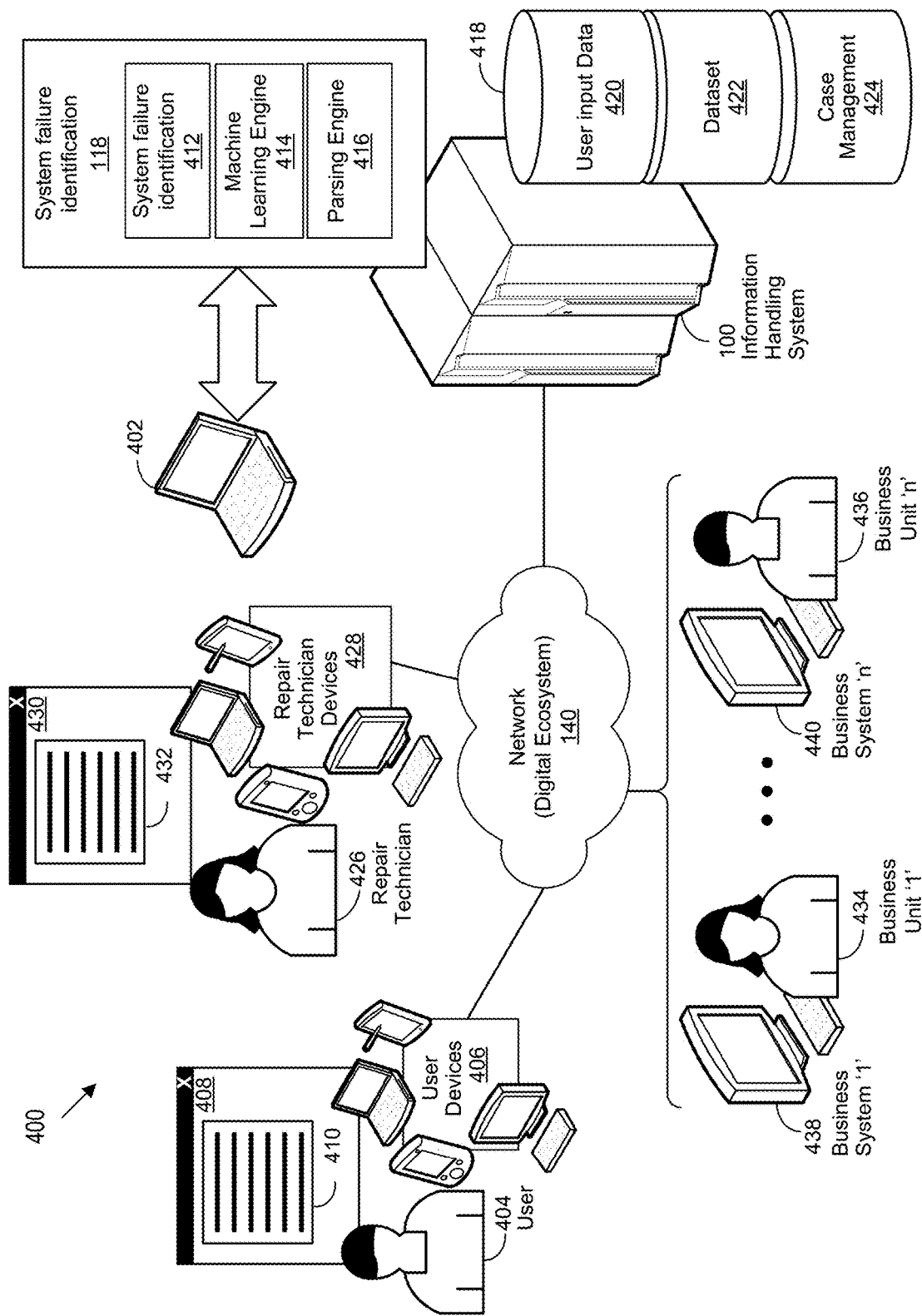
FIG. 4 shows a block diagram of a system failure identification environment as implemented in the system and method of the present invention.

FIG. 4 is a block diagram of a system failure identification environment 400 implemented in accordance with an embodiment of the invention. The system failure identification environment 400 includes information handling system 100. The information handling system 100 includes the system failure identification system 118 which can execute on a hardware processor of an information handling system 100. The system failure identification system 118 interacts with a potentially faulty device 402. In certain implementations, the potentially faulty device 402 is received at a repair center depot for troubleshooting and repair. The potentially faulty device 402 can include one or more of an information handling system, a component of an information handling system and a component associated with an information handling system.

In various embodiments, a user 404 generates a system failure identification request, which can be in the form of a unique product identifier associated with the potentially faulty device 402. The system failure identification request can be provided to the system failure identification system 118. In various embodiments, the user 404 may use a user device 406 to interact with the system failure identification system 118.

As used herein, a user device 406 refers to an information handling system such as a personal computer, a laptop computer, a tablet computer, a personal digital assistant (PDA), a smart phone, a mobile telephone, or other device that is capable of communicating and processing data. In various embodiments, the user device is configured to present a system failure identification user interface 408. In various embodiments, the system failure identification user interface 408 presents a graphical representation 410 of system failure identification information which are automatically generated in response to interaction with the system failure identification system 118. In various embodiments, the user device 406 is used to exchange information between the user 202 and the system failure identification system 118 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the system failure identification user interface 408 may be presented via a website. In various embodiments, the website is provided by one or more of the system failure identification system 118. For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

In various embodiments, the system failure identification system 118 includes a system failure identification module 412 which performs a system failure identification operation. The system failure identification system 118 also includes a machine learning engine 414 which interacts with the system failure identification module 412 when performing the system failure identification operation. In certain embodiments, the system failure identification system 118 also includes a parsing engine 416 which interacts with the system failure identification module 412 when performing the system failure identification operation.

In various embodiments, the system failure identification environment 400 includes a storage repository 418. The storage repository 418 may be local to the system executing the system failure identification system 118 or may be executed remotely. In various embodiments, the storage repository includes one or more of a user input data repository 420, a dataset repository 422 and a case management repository 424. In certain embodiments, the case management repository 424 stores fault data which can include prior troubleshooting steps. In certain embodiments, the fault data is accessed by a technician via a function key (e.g., a F9 function key). In certain embodiments, data stored within the case management repository 424 includes fault data (e.g., comments such as prior troubleshooting information) which is not necessarily separated into words or sentences (e.g., a no power condition might be listed as nopow, Nopow, nopowe, Nopowe, etc.). When the fault data is not separated into words or sentences, the parsing engine 416 reads the fault data, splits the fault data into combinations of alphabet words (e.g., 4-20 alphabet words) and generates a table with key words and frequency.

In various embodiments, the system failure identification system 118 with repair technician(s) 426. The repair technician(s) 426 may be part of a repair depot, which can be a corporate or third-party repair center. In certain implementations, the repair technician(s) 426 receive system failure identification request from the user 404, which can be in the form of a unique product identifier associated with the potentially faulty device 402. Furthermore, the repair technician(s) 426 can receive the potentially faulty device 402.

In various embodiments, the repair technician(s) 426 may use a repair technician device 428 to interact with the system failure identification system 118. As used herein, a repair technician device 428 refers to an information handling system such as a personal computer, a laptop computer, a tablet computer, a personal digital assistant (PDA), a smart phone, a mobile telephone, or other device that is capable of communicating and processing data. In various embodiments, the user device is configured to present a dynamic interactive expert troubleshooting system (ETS) graphical user interface (GUI) 430. In various embodiments, the dynamic interactive ETS GUI 430 presents a graphical representation 432 of interactive troubleshooting information which are automatically generated in response to interaction with the system failure identification system 118. In various embodiments, the repair technician device 428 is used to exchange information between the repair technician (s) 426 and the system failure identification system 118 through the use of a network 140.

In various embodiments, the dynamic interactive ETS GUI 430 may be presented via a website. In various embodiments, the website is provided by one or more of the system failure identification system 118. For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

In certain embodiments, the system failure identification system 118 is maintained and/or accessed by various business units represented by business unit '1" 434 through business unit "n" 436, which can be part of a larger business entity that supports the potentially faulty product 402. Examples of business unit '1" 434 through business unit "n" 436 can include product support, customer support, product development, product repair, etc. Communications by business unit '1" 434 through business unit "n" 436 can be to network 140 by implementing respective business system '1' 438 through business system 'n' 440.

Figure 5:
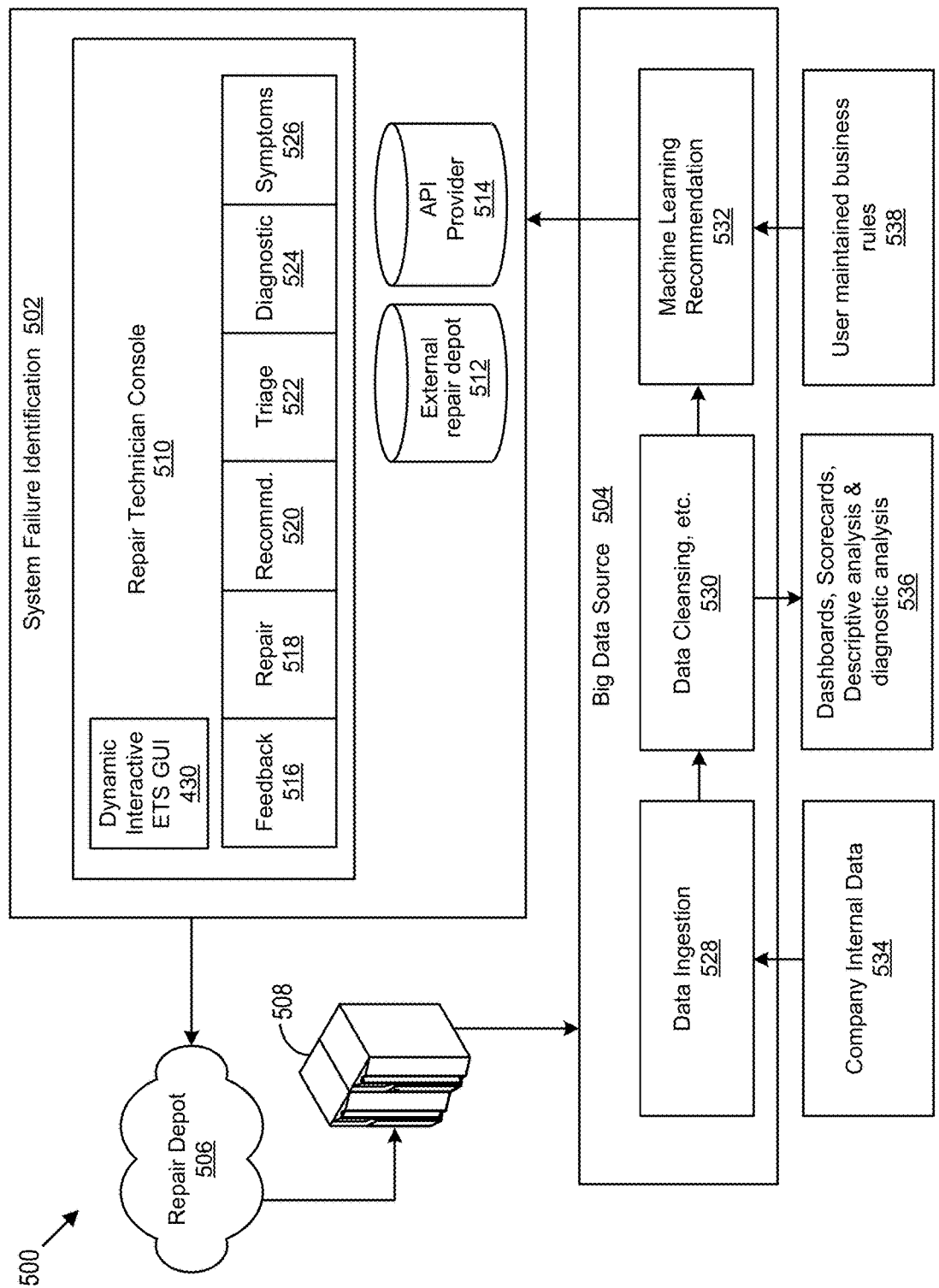
FIG. 5 shows a functional block diagram of a system failure identification environment when performing a failure identification as implemented in the system and method of the present invention.

Referring to FIG. 5 a functional block diagram of a system failure identification environment 500 when performing a failure identification operation is shown. More specifically, a system failure identification system 502 receives information from a big data source 504 such as a big data lake. The system failure identification system 502 provides repair information to a repair depot 506, which may be managed by a third-party repair organization. The repair depot 506 then provides repair files to a company file server 508 which then provides repair information to the big data source 504.

In certain embodiments, the system failure identification system 502 includes a repair technician console 510 as well as an external repair depot repository 512 and an application program interface (API) provider repository 514. The external repair depot repository 512 receives repair files with model feedback from the repair technician console 510 and stores repair model output data as well as repair business rules. The API provider repository 514 stores model APIs. In certain embodiments the model APIs include one or more of R model APIs and Python model APIs. In certain embodiments, the repair technician console 510 may be stored and executed within a cloud service such as the Amazon Web Services (AWS) cloud services. In certain embodiments, the external repair depot repository 512 may be stored within a cloud service such as the AWS cloud service. In certain embodiments, the API provider repository 514 may be stored within a cloud service such as the AWS cloud service.

The repair technician console 510 includes the dynamic interactive ETS GUI 430, a feedback module 516, a repair module 518, a recommendations module 520, a triage module 522, a diagnostics module 524 and a symptoms module 526. The big data source 504 includes a data ingestion portion 528, a data cleansing, text parsing and data mining portion 530 and a machine learning recommendation system 532. In certain embodiments, the data ingestion portion 528 ingests data into a Hadoop Distributed File System (HDFS). In certain embodiments, and as further described below, the machine learning recommendation system 532 uses decision trees when performing the learning and recommending. The big data source 504 receives company internal data 534 through the data ingestion portion 528. The big data source 504 provides dashboards, scorecards, descriptive analysis information and diagnostic analysis information 536 which are used when performing a system failure identification operation. In certain embodiments, the machine learning recommendation system 532 may receive user-maintained business rules 538 which are potentially used to override the learning and recommending provided by the machine learning recommendation system 532. In certain embodiments, the company internal data 534 includes fault data (e.g., comments) which is not necessarily separated into words or sentences (e.g., a no power condition might be listed as nopow, Nopow, nopowe, Nopowe, etc.). When the fault data is not separated into words or sentences, the data cleansing, text parsing and data mining portion 530 reads the comments, splits the comments in combinations of alphabet words and generates a table with key words and frequency.

Figure 6:
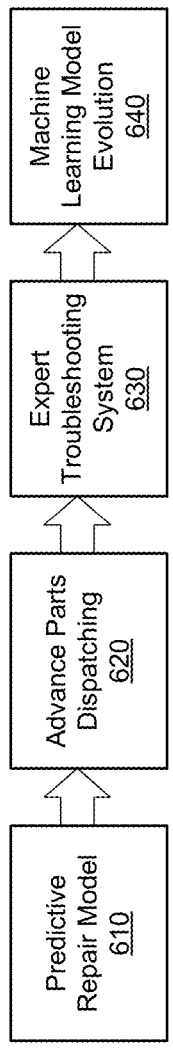
FIG. 6 shows a flow chart of capabilities for depot predictive repair as implemented in the system and method of the present invention.

Referring to FIG. 6, a flow chart of capabilities for depot predictive repair is shown. A predictive model 610 anticipates repair solutions and suggests repair actions necessary to resolve customer issues. If said suggested repair actions do not resolve all the customer issues, this becomes the input into the expert troubleshooting system 630 that can be used to accelerate machine learning. Complementary machine learning models can evolve 640 as the more precise and correct information and data is gathered regarding identifying, troubleshooting, and providing repair instructions.

Figure 7:
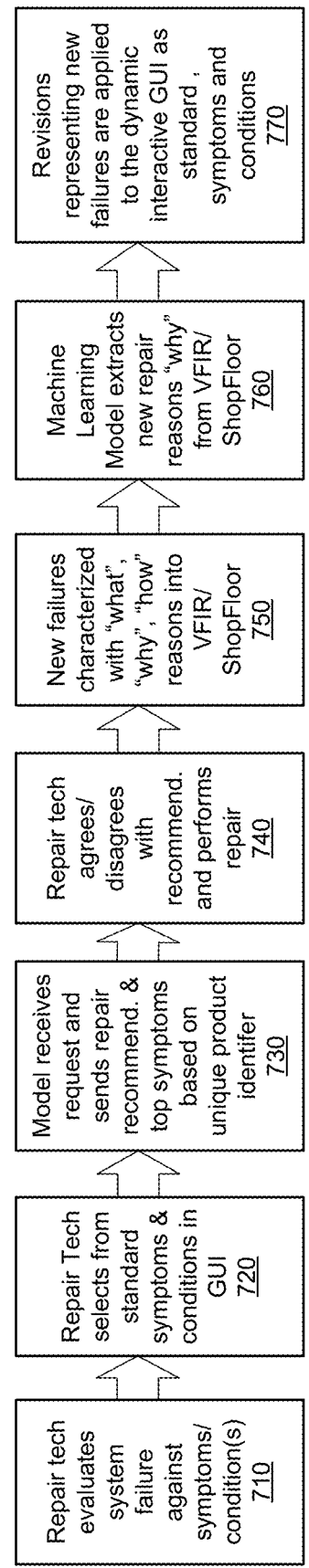
FIG. 7 shows a flow chart of a workflow for an expert troubleshooting system as implemented in the system and method of the present invention.

Referring to FIG. 7, a flow chart of a workflow for an expert troubleshooting system is shown. In certain implementations, an API allows non-experts users access an analytics engine, such as analytics engine 226 of FIG. 2 to leverage knowledge base of experts in making use of the workflow.

For a potentially faulty device, repair technician(s) evaluates the system for failure as to symptoms/conditions 710. The repair technician(s) selects from known or standard symptoms and conditions in a dynamic interactive GUI 720. A machine learning model receives requests for repair and sends recommendations and top symptoms based on a unique product identifier of the potentially faulty device 730. The repair technician(s) can either agree or disagree with the recommendation and perform/not perform the repair 740. New failures can be characterized as to "what", "why", and "how" reasons which can be added to Verified Field Incident Rate (VFIR) data or a "Shop Floor" entry 750. The machine learning model can extract new repair reasons as to "why" from the VFIR data or "Shop Floor" entry 760. Revisions representing new failures are applied to the dynamic interactive GUI as standard, symptoms and conditions 770.

Figure 8:
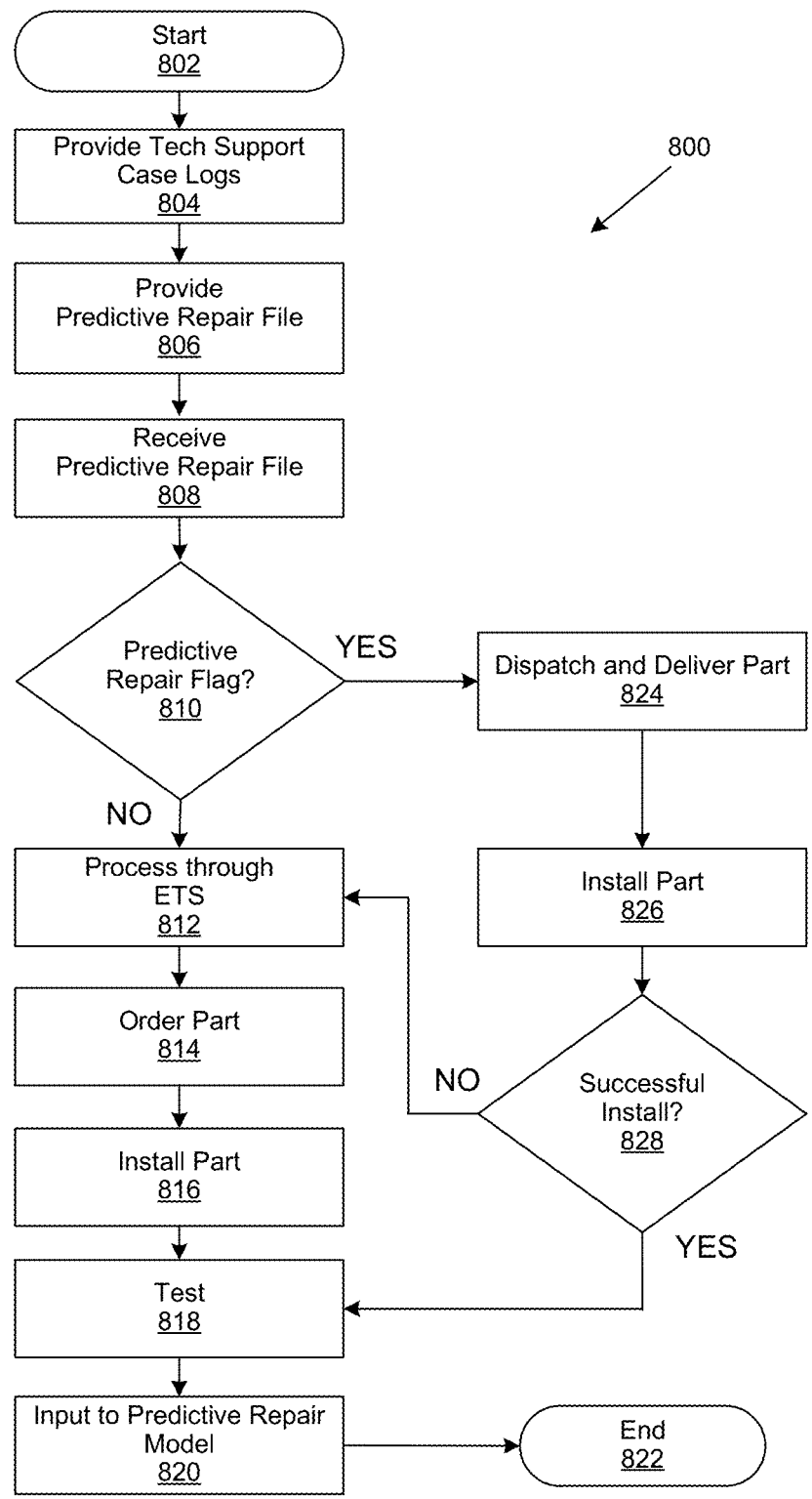
FIG. 8 shows a generalized flowchart for a predictive repair process flow as implemented in the system and method of the present invention.

FIG. 8 is a generalized flowchart 800 for a predictive repair process flow. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 802, the process 800 starts. At step 804, a customer reports and request repair service on a faulty device. A repair center or repair depot receives the request and a repair technician can create a case log for the faulty device. The case log can be entered into a predictive repair model. At step 806, a predictive repair file is provided. The predictive repair model can provide the predictive repair file. At step 808, the predictive repair file is received for inspection.

In the predictive repair file, there may be a flag that indicates a recommendation as to a part for replacement for the repair. If the flag is inconclusive, following the NO branch of block 810, then at step 812, the ETS process is ran. The ETS process can be an interactive process. At step 814, from the recommendation of the ETS process a recommendation is provided and a part is ordered. At step 816, the part is installed into the faulty device. At step 818, a test can be performed on the repaired device with the replaced part. At step 820, an input is provided to the predictive repair model. At block 820, the process 800 ends.

If the flag indicates that a part for installation in the faulty device, following the YES branch of block 810, at step 824 the part is dispatched. At step 826, the part is installed in the faulty device. A determination is made if the installation is successful. If the installation is not successful, following the NO branch of block 828, then at step 812, the ETS process is ran. If the installation is successful, following the YES branch of block 828, at step 818, a test can be performed on the repaired device with the replaced part. At step 820, an input is provided to the predictive repair model. At block 820, the process 800 ends.

Figure 9:
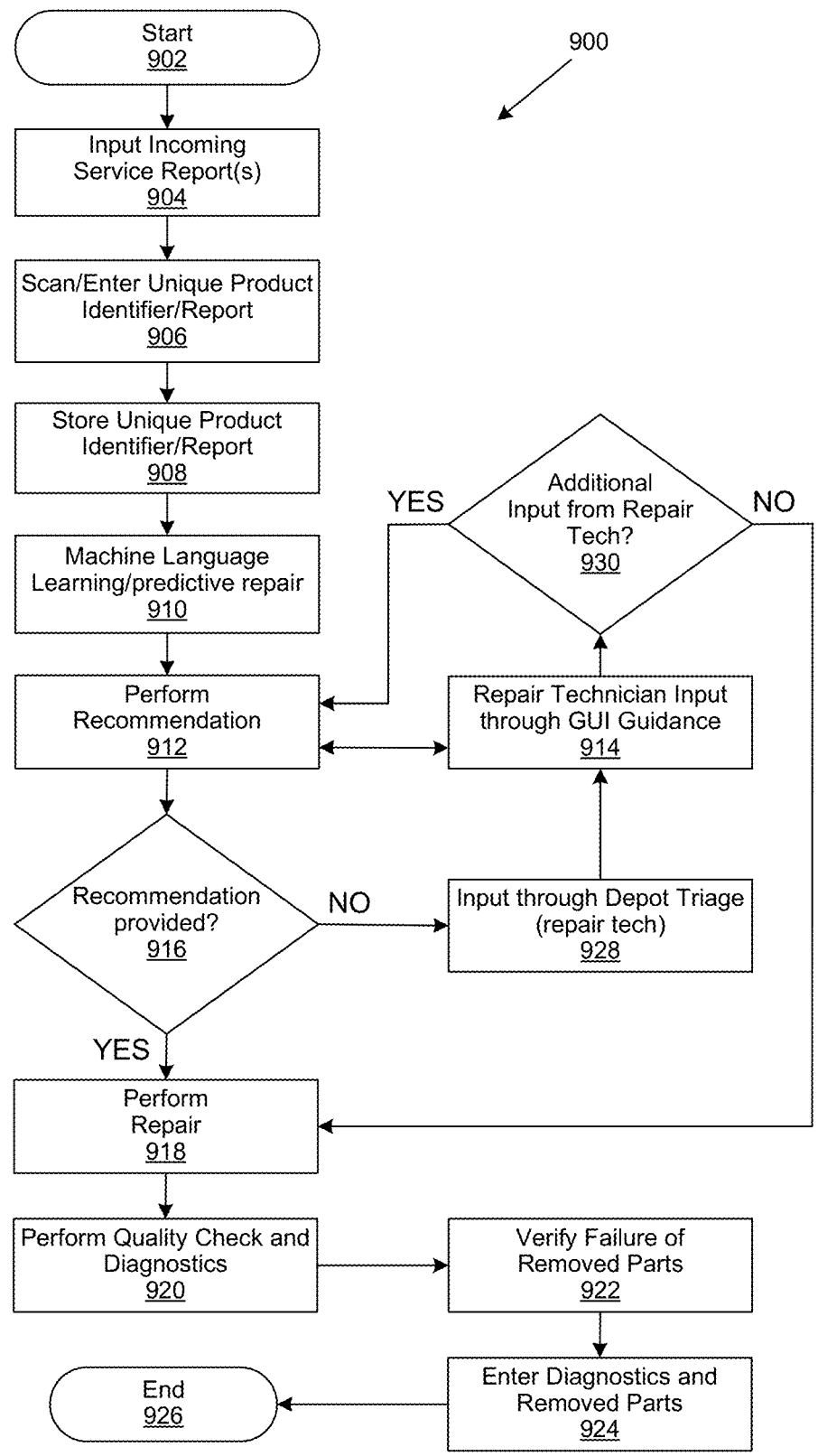
FIG. 9 shows a generalized flowchart for an expert troubleshooting with dynamic interactive process flow as implemented in the system and method of the present invention.

FIG. 9 is a generalized flowchart 900 for an expert troubleshooting with dynamic interactive process flow. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 902, the process 900 starts. At step 904, a faulty device (system) is received that can include service reports/unique product identifiers. At step 906, the service report/unique product identifier is scanned and entered. At step 908, the unique product identifier is entered and stored into a repository that includes other unique product identifiers, and can include historical repair history, symptoms and diagnostics, etc. At step 910, data from the repository is provided as part of training of machine learning model(s) and depot predictive repair. At step 912, the machine learning model is deployed and through a recommendation engine a repair recommendation can be performed.

During step 912, an interaction with step 914 can take place. The interaction can include a repair technician through a dynamic and interactive graphical user interface (GUI) interacting with the recommendation engine. The dynamic and interactive GUI can include various dynamic dropdown menus and allow for real time feedback to the recommendation engine to improve the machine learning model as to repair recommendation. Furthermore, interaction with the repair technician provides a guided path for repair.

In certain instances, the recommendation engine provides a recommendation as to repairing the faulty device. If a recommendation is provided, following the YES branch of block 916, at step 918, repair is performed on the faulty device. At step 920, quality check and diagnostics are performed as to the repaired device. At step 922, verification can be performed as to the failure of the removed parts of the faulty device. At step 924, information or data from steps 920 and 922 can be fed back into the machine learning model or provided to the repository to be used by the machine learning model. At step 926, the process 900 ends.

In certain instances, the recommendation engine does not provide a recommendation. This may be due to lack of information/data or irrelevant information/data that can be considered as "noise". If no recommendation is provided, following the "NO" branch of block 916, at step 928 input can be provided by a repair technician. The input can be provided through a depot triage, where the repair technicians provides free form input/call logs as to specific observed symptoms of the faulty device, then at step 914 through the dynamic and interactive GUI, the repair technician can provide information or data to the recommendation engine, and step 912 is performed.

In certain instances, additional input from the technician is needed. This additional input can be in the event that no recommendation was provided, or in cases where the recommendation may be acceptable. Following the YES branch of block 930, if additional information is provided from the repair technician, step 912 is performed, otherwise the NO branch of 930 is followed.

Figure 10:
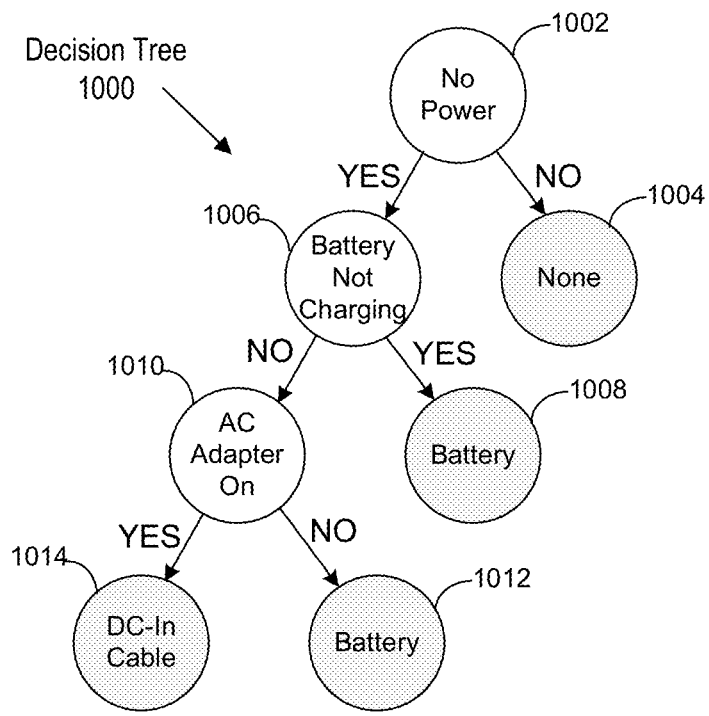
FIG. 10 shows a decision tree as implemented in the system and method of the present invention.

FIG. 10 shows an example decision tree. In determining a recommendation, a recommendation engine of an expert trouble shooting system can implement various algorithms, include the use of decision trees. Decision tree 1000 is an example of an instance of a report for a faulty device, that includes different levels of symptoms. The decision tree is drilled down until a possible solution is determined. Node 1002 is a high-level symptom representing "No power." If the there is a power, following the NO branch of node 1002, the indication at node 1004 is there is no problem as to power. If there is no power, following the YES branch of node 1002, then next level symptom "battery not charging" represented by node 1006 is determined. If the battery is charging, following the YES branch of node 1006, the indication at node 1008 is that the problem may be the battery. If the battery is charging, following the NO branch of node 1006, the next level symptom "AC adapter on" represented by node 1010 is determined. If the AC adapter is determined to be ON, following the NO branch of node 1010, the indication at node 1012 is that the problem may be the battery. Otherwise, following the YES branch of node 1010, the indication at node 1014 may be the DC-In cable.

Figure 11:
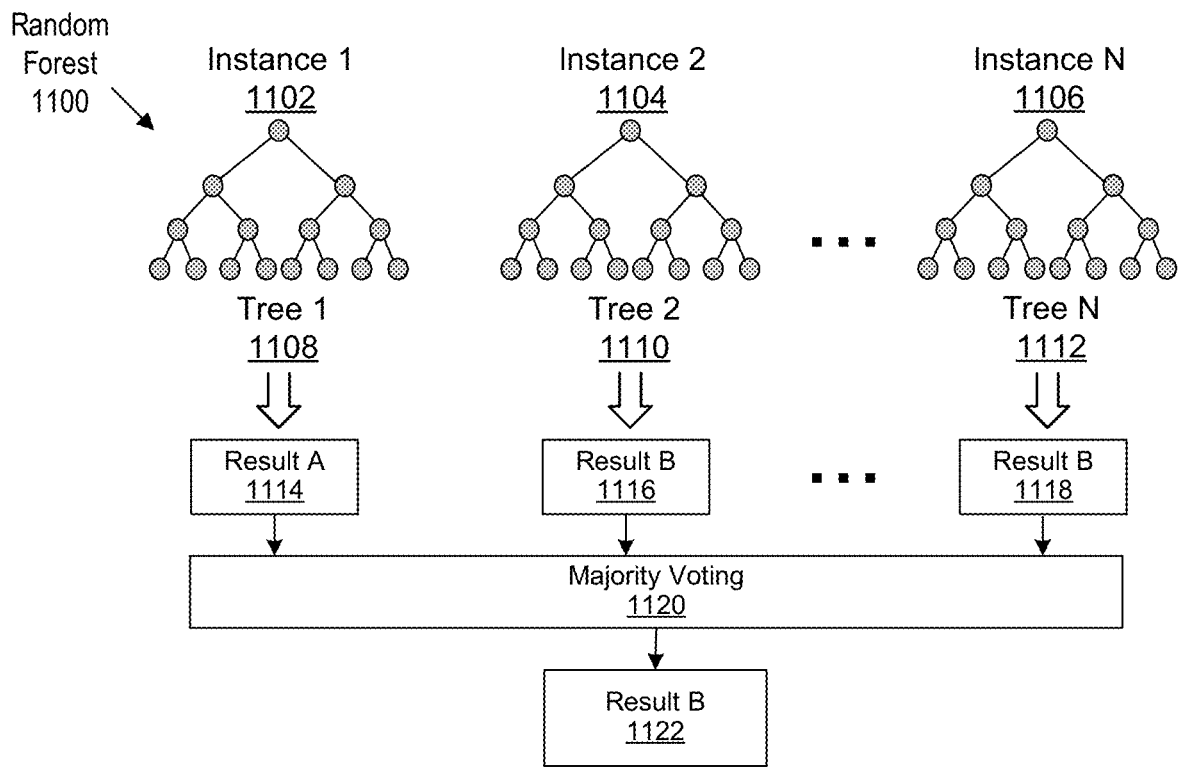
FIG. 11 shows a random forest decision estimation as implemented in the system and method of the present invention.

FIG. 11 shows an example random forest decision estimation. In determining a recommendation, the use of different decision trees, such as decision tree 1000, can be implemented as part of machine learning models. Random forest 1100 can be used by the recommendation engine in making more concise or accurate recommendations regarding similar reported instances or symptoms.

The random forest 1100 includes multiple instances or reported symptoms as represented by "instance 1" 1102, "instance 2" 1104 through "instance N" 1106. The instances, "instance 1" 1102, "instance 2" 1104 through "instance N" 1106 respectively represent different decision trees, "tree 1" 1108, "tree 2" 1110 through "tree N" 1112. The decision trees, "tree 1" 1108, "tree 2" 1110 through "tree N" 1112 respectively provide different results or values. Decision tree "tree 1" 1108 has a result value of "A" 1114. Decision tree "tree 2" 1110 has a result value of "B" 1116. Decision tree "tree N" 1106 has a result value of "B" 1116. Through the use of majority voting 1120, a consensus decision is made as to a recommendation. In this example, if the majority value is "B", then the consensus result or value 1122 is "B", which is the recommendation provided by recommendation engine as to repair.

Figure 12:
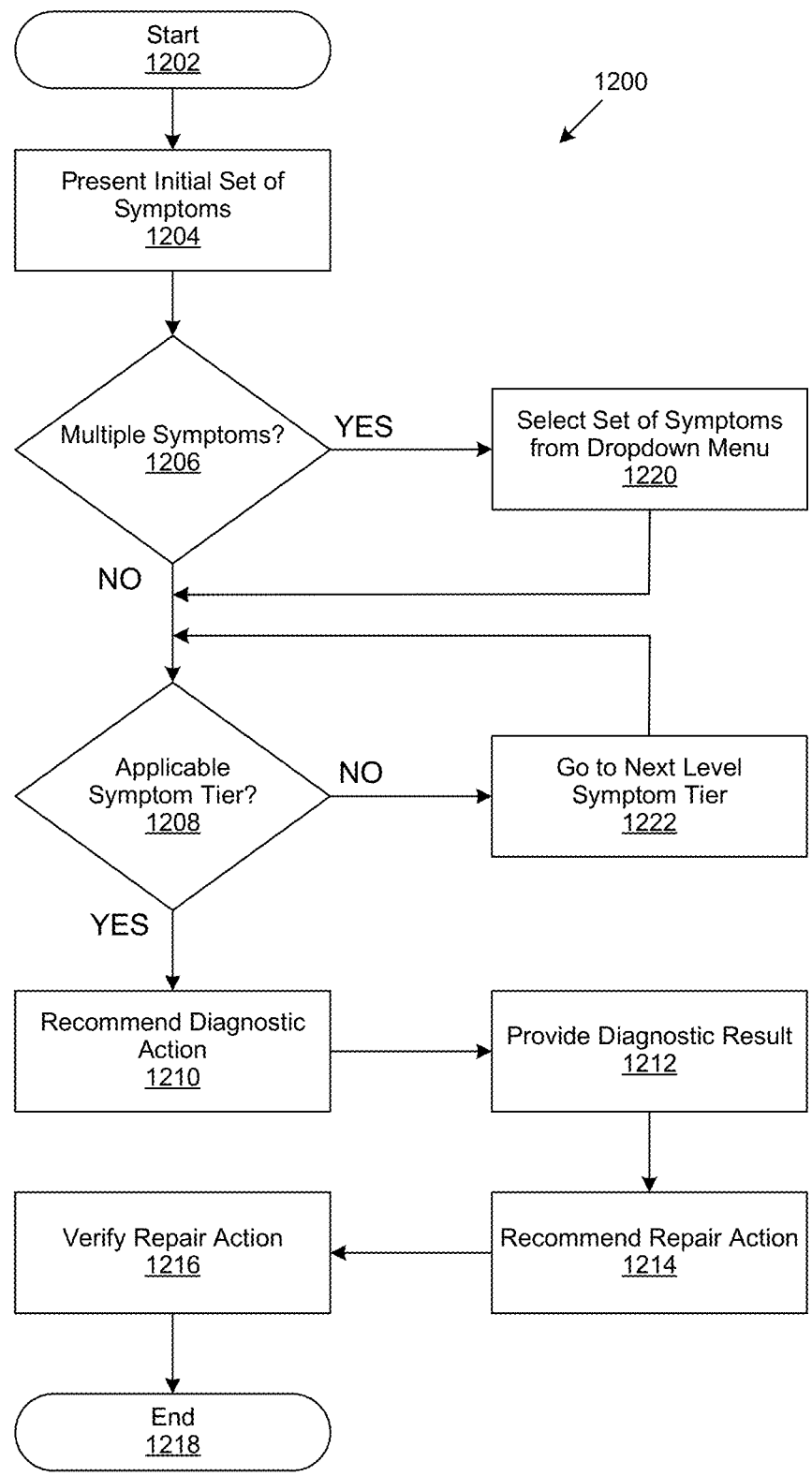
FIG. 12 shows a generalized flowchart for a dynamic interactive graphical user interface flow as implemented in the system and method of the present invention.

FIG. 12 is a generalized flowchart 1200 for a dynamic interactive graphical user interface process flow. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

A dynamic interactive graphical user interface (GUI) is provided, and specifically provided to repair technicians to allow feedback or input to a machine learning model while the repairing a faulty device. The feedback or input from the GUI may be real time as the repair is performed on the faulty device. As repair is performed various menus, including drop down menus can be provided by the dynamic interactive GUI. Such feedback or input can be in form of both structured dropdown menus & unstructured data or information, such as repair comments. Depending on the feedback or input from the repair technician a new recommendation may be provided.

At block 1202, the process 1200 starts. At step 1204, a startup screen with an initial set of symptoms may be presented to a user, such as a repair technician. In certain instances, multiple symptoms may be presented. If there are not multiple symptoms, then following the NO branch of block 1206, a determination is made step 1208. There may be multiple tiers related to a symptom, such as discussed as to decision tree 1000 of FIG. 10. If the applicable symptom tier is presented, then following the YES branch of block 1208, step 1210 is performed. At step 1210, if applicable, a diagnostic action is recommended and performed. At step 1212, if applicable, the diagnostic result is provided. At step 1214, a repair action is recommended. At step 1216, verification is performed as to the repair action. At block 1218, the process 1200 ends.

If there are multiple symptoms presented, at step 1220, a dropdown menu can be provided to select from a set of symptoms from multiple symptoms. The process 1200 continues at block 1208.

If the applicable symptom tier is not presented, at step 1222, the next lower level symptom tier is presented. The process 1200 continues at block 1208, and loops to 1222 until the applicable symptom tier is presented.

Figure 13:
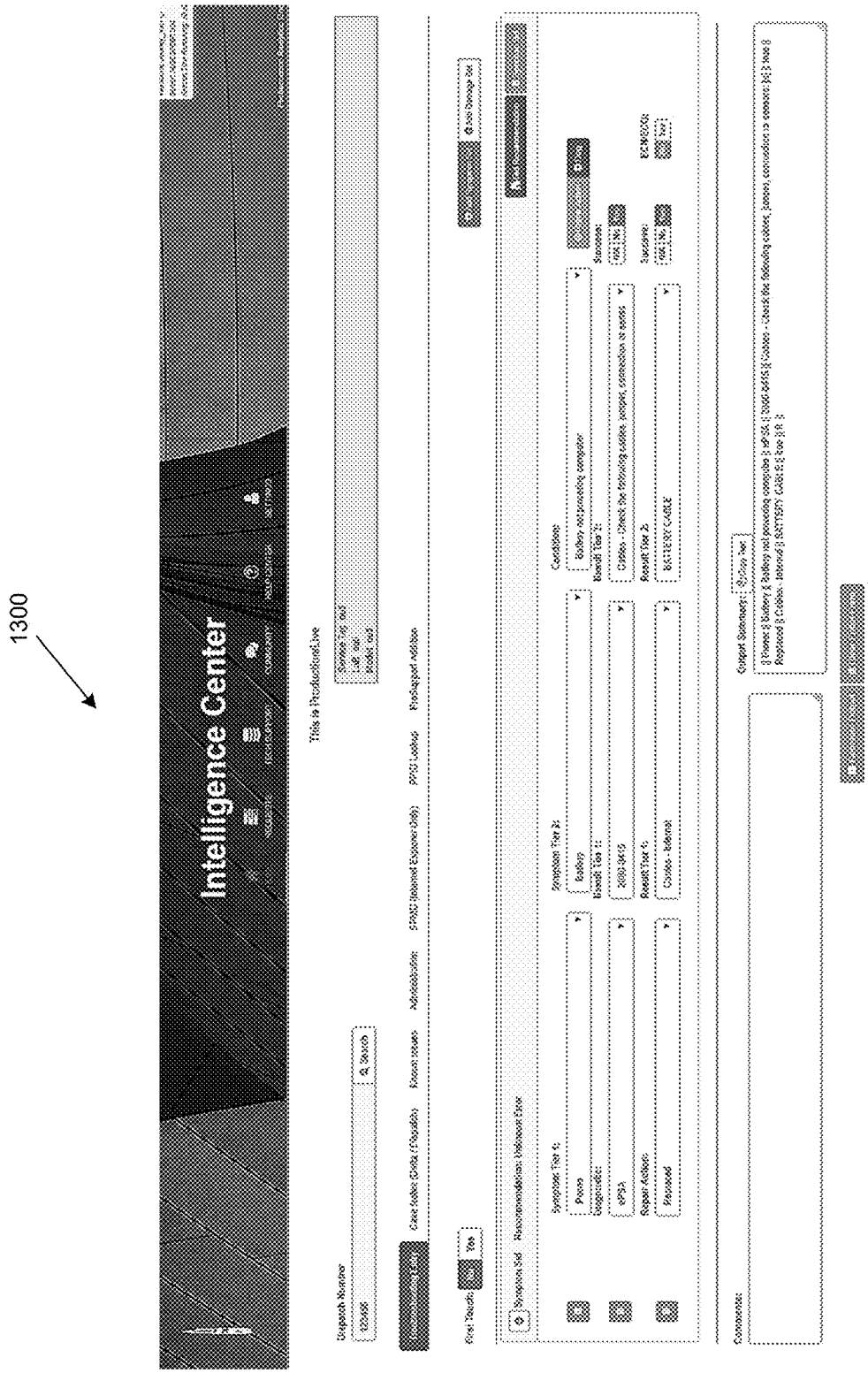
FIG. 13 shows an example screen presentation of a symptom set user interface.

Referring to FIG. 13, an example screen presentation of a symptom set user interface 1300 is shown.

Figure 14:
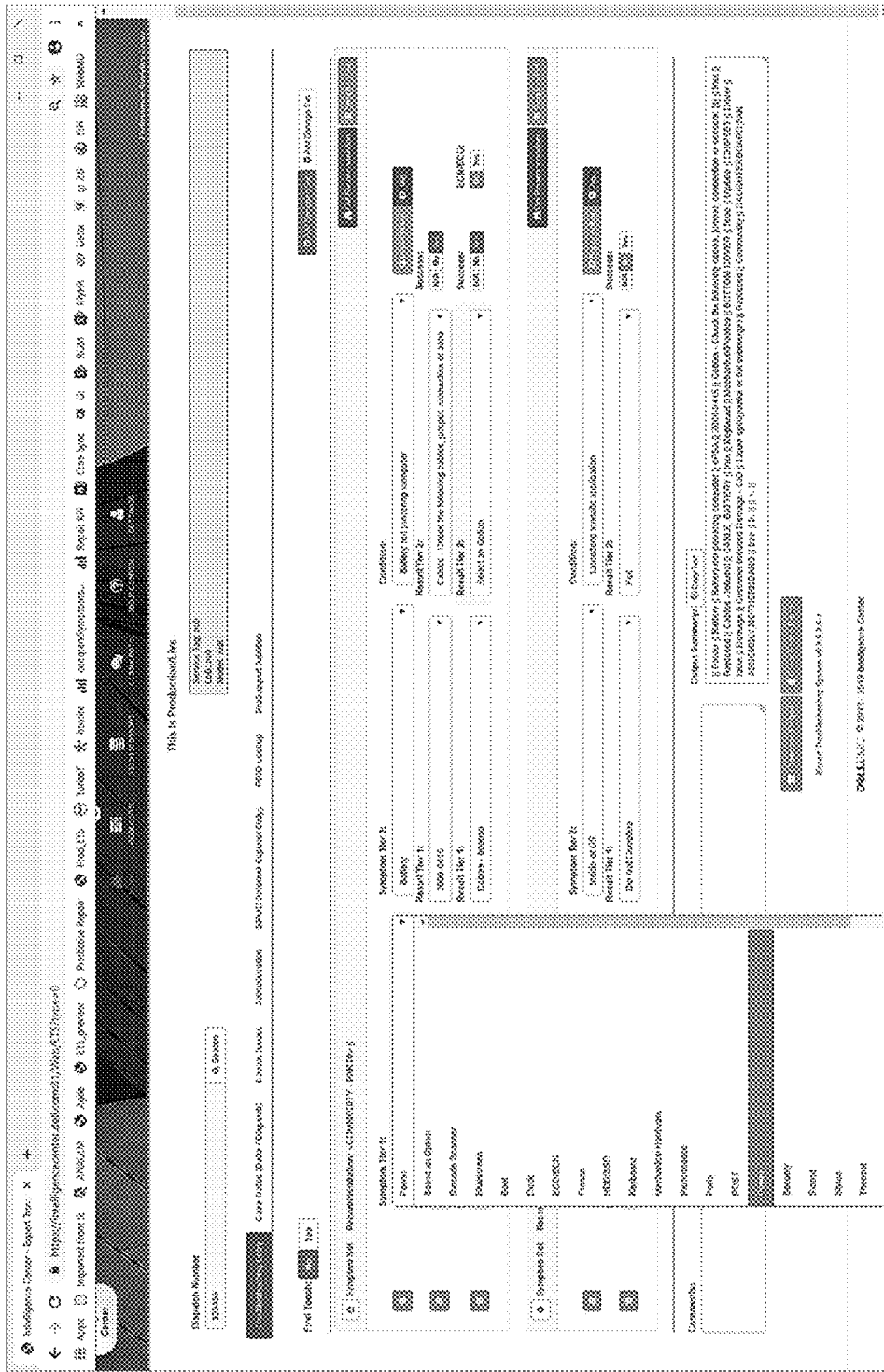
FIG. 14 shows an example screen presentation of a symptom set dropdowns user interface.

Referring to FIG. 14, an example screen presentation of a symptom set dropdowns user interface 1400 is shown.

Figure 15:
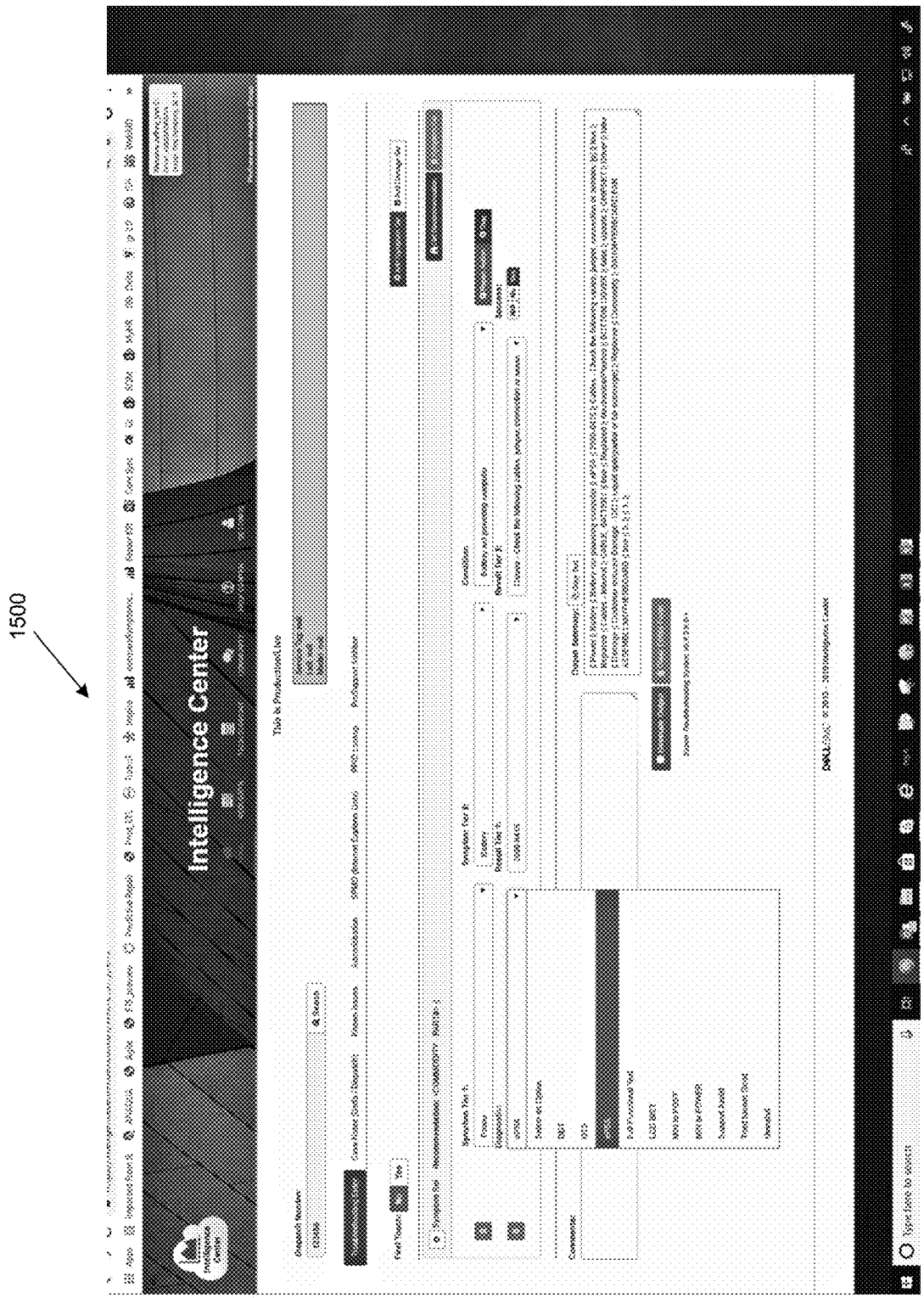
FIG. 15 shows an example screen presentation of a diagnostic action user interface.

Referring to FIG. 15, an example screen presentation of a diagnostic action user interface 1500 is shown.

Figure 16:
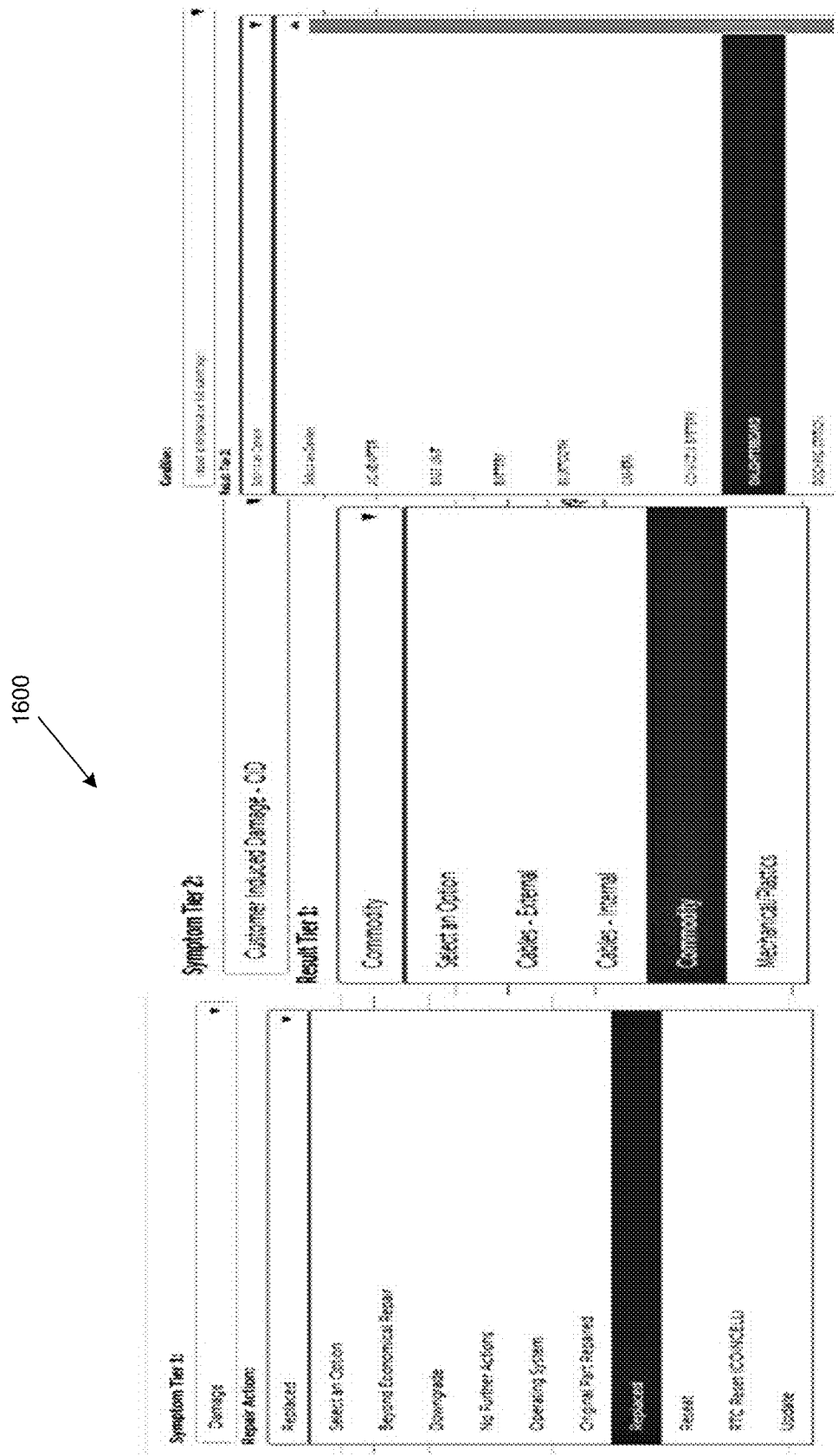
FIG. 16 shows an example screen presentation of a repair action user interface.

Referring to FIG. 16, an example screen presentation of a repair action user interface 1600 is shown.

Figure 17:
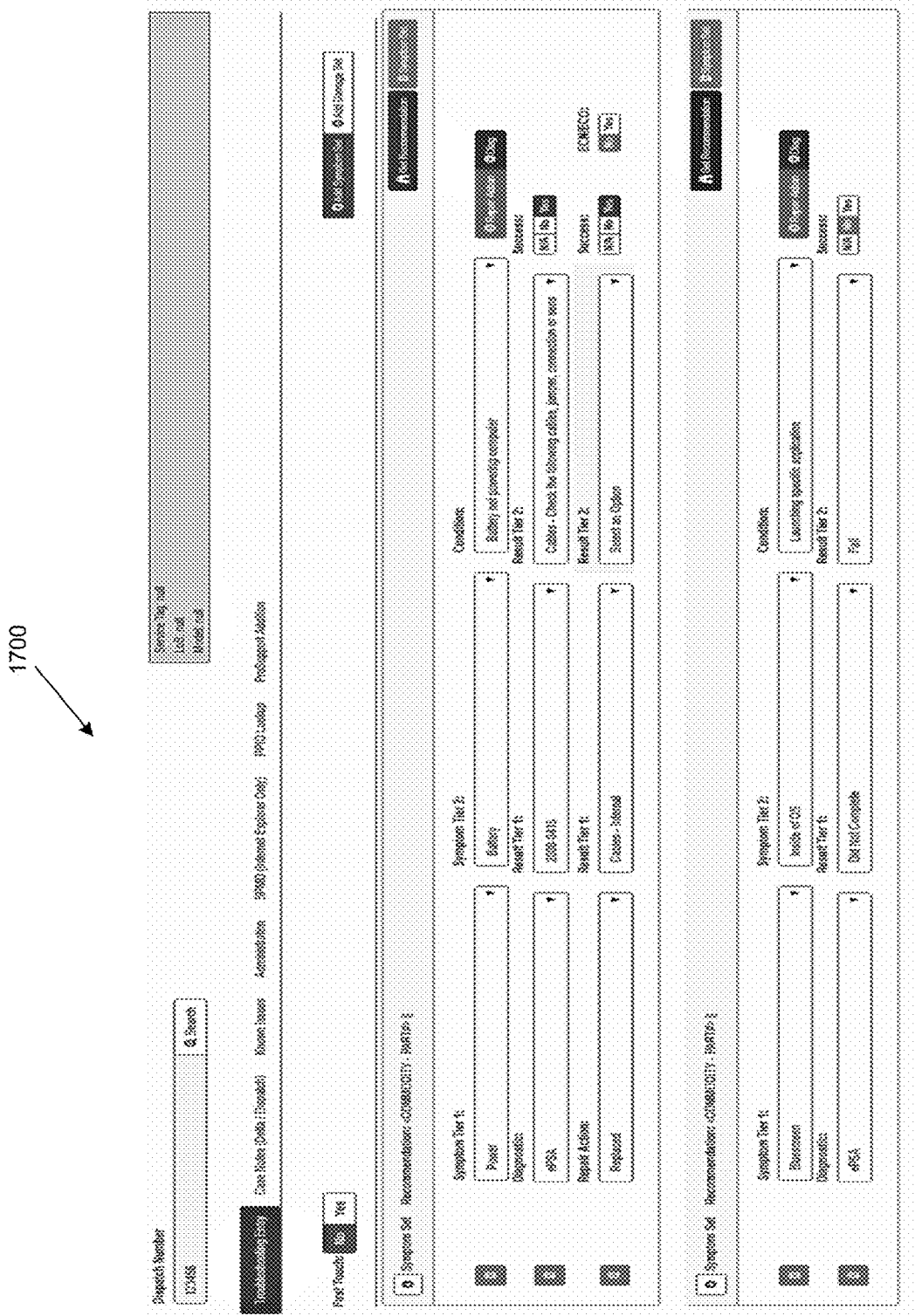
FIG. 17 shows an example screen presentation of a multi symptom user interface.

Referring to FIG. 17, an example screen presentation of a multi symptom user interface 1700 is shown.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a system failure repair operation, comprising:
    receiving information regarding symptoms related to a faulty device;
    storing the information with other historical information regarding the symptoms;
    receiving additional information as the faulty device is diagnosed;
    filtering all the information as to relevant and irrelevant information;
    indicating whether a repair recommendation is provided for the faulty device; and
    implementing machine learning that uses the stored information, historical information, and additional information to provide a repair recommendation if indicating shows no repair recommendation, wherein the additional information is from a big data source that includes data cleansing, text parsing and data mining.

2. The method of claim 1 wherein the information regarding symptoms is a unique product identifier.

3. The method of claim 1, further comprising selecting one symptom from the symptoms to provide the repair recommendation.

4. The method of claim 1, further comprising selecting an appropriate symptom tier for the repair recommendation.

5. The method of claim 1 wherein the receiving additional information is through a dynamic interactive graphical user interface.

6. The method of claim 1, further comprising providing information as to repair and validation regarding the faulty device.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:

receiving information regarding symptoms related to a faulty device;

storing the information with other historical information regarding the symptoms;

receiving additional information as the faulty device is diagnosed;

filtering all the information as to relevant and irrelevant information;

indicating whether a repair recommendation is provided for the faulty device; and implementing machine learning that uses the stored information, historical information, and additional information to provide a repair recommendation if indicating shows no repair recommendation, wherein the additional information is from a big data source that includes data cleansing, text parsing and data mining.

8. The system of claim 7 wherein the information regarding symptoms is a unique product identifier.

9. The system of claim 7, further comprising selecting one symptom from the symptoms to provide the repair recommendation.

10. The system of claim 7, further comprising selecting an appropriate symptom tier for the repair recommendation.

11. The system of claim 7 wherein the receiving additional information is through a dynamic interactive graphical user interface.

12. The system of claim 7, further comprising providing information as to repair and validation regarding the faulty device.

13. A non-transitory, computer-readable storage medium embodying computer program code, the computer program code comprising computer executable instructions configured for:

receiving information regarding symptoms related to a faulty device;

storing the information with other historical information regarding the symptoms;

receiving additional information as the faulty device is diagnosed;

filtering all the information as to relevant and irrelevant information;

indicating whether a repair recommendation is provided for the faulty device; and implementing machine learning that uses the stored information, historical information, and additional information to provide a repair recommendation if indicating shows no repair recommendation, wherein the additional information is from a big data source that includes data cleansing, text parsing and data mining.

14. The non-transitory, computer-readable storage medium of claim 13 wherein the information regarding symptoms is a unique product identifier.

15. The non-transitory, computer-readable storage medium of claim 13, further comprising selecting one symptom from the symptoms to provide the repair recommendation.

16. The non-transitory, computer-readable storage medium of claim 13, further comprising selecting an appropriate symptom tier for the repair recommendation.

17. The non-transitory, computer-readable storage medium of claim 13 wherein the receiving additional information is through a dynamic interactive graphical user interface.

18. The non-transitory, computer-readable storage medium of claim 13, further comprising providing information as to repair and validation regarding the faulty device.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

* * * * *